June 9, 1942.  S. A. SCHERBATSKOY  2,285,840
WELL SURVEY METHOD AND APPARATUS
Filed Aug. 4, 1939  2 Sheets-Sheet 1
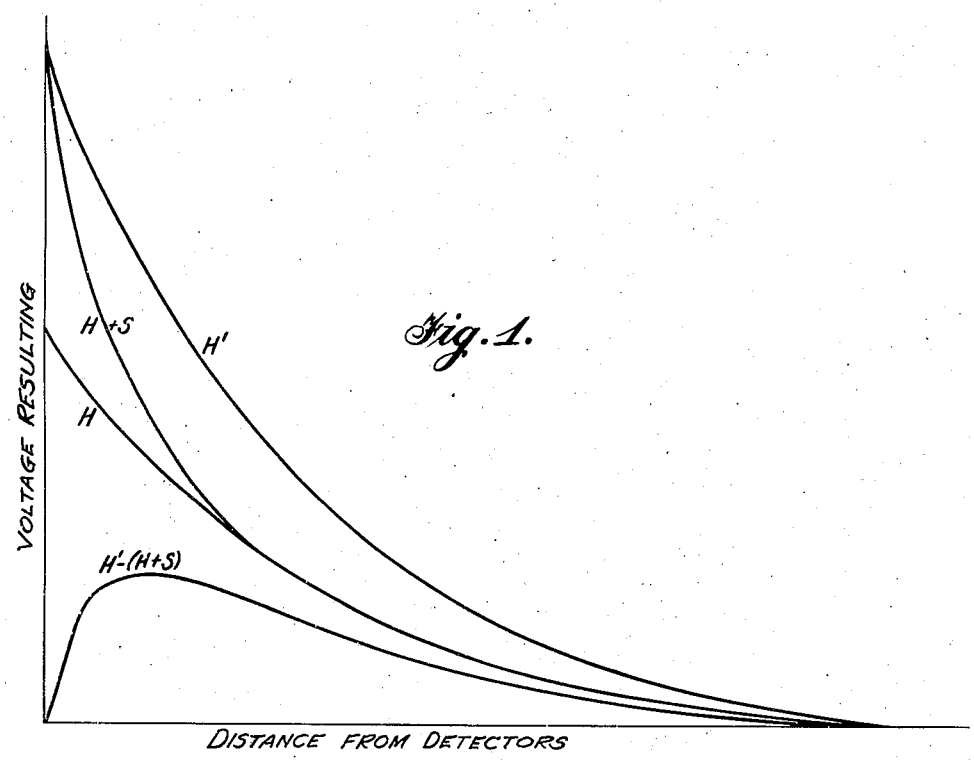
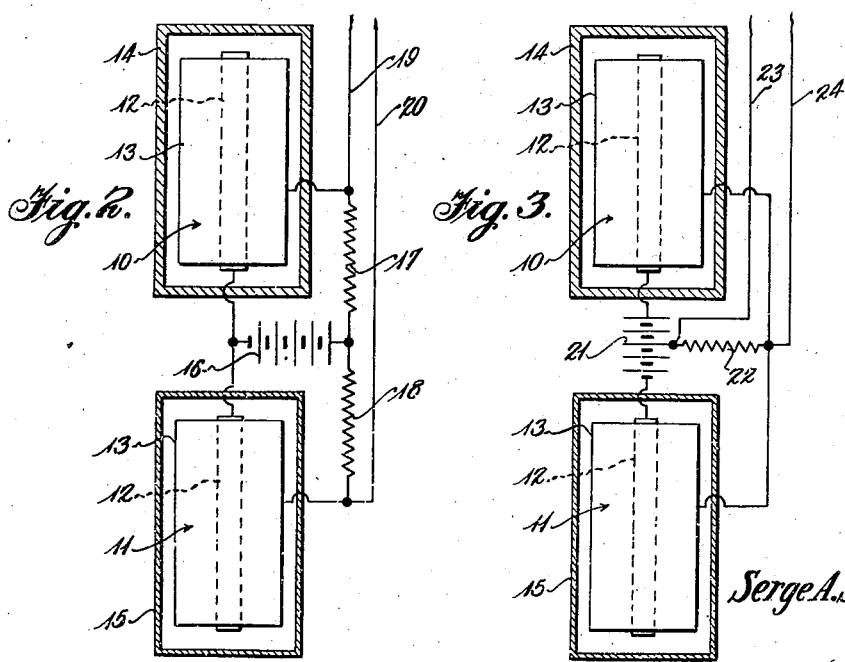
Inventor
Serge A. Scherbatskoy
By Stevens and Davis
Attorneys

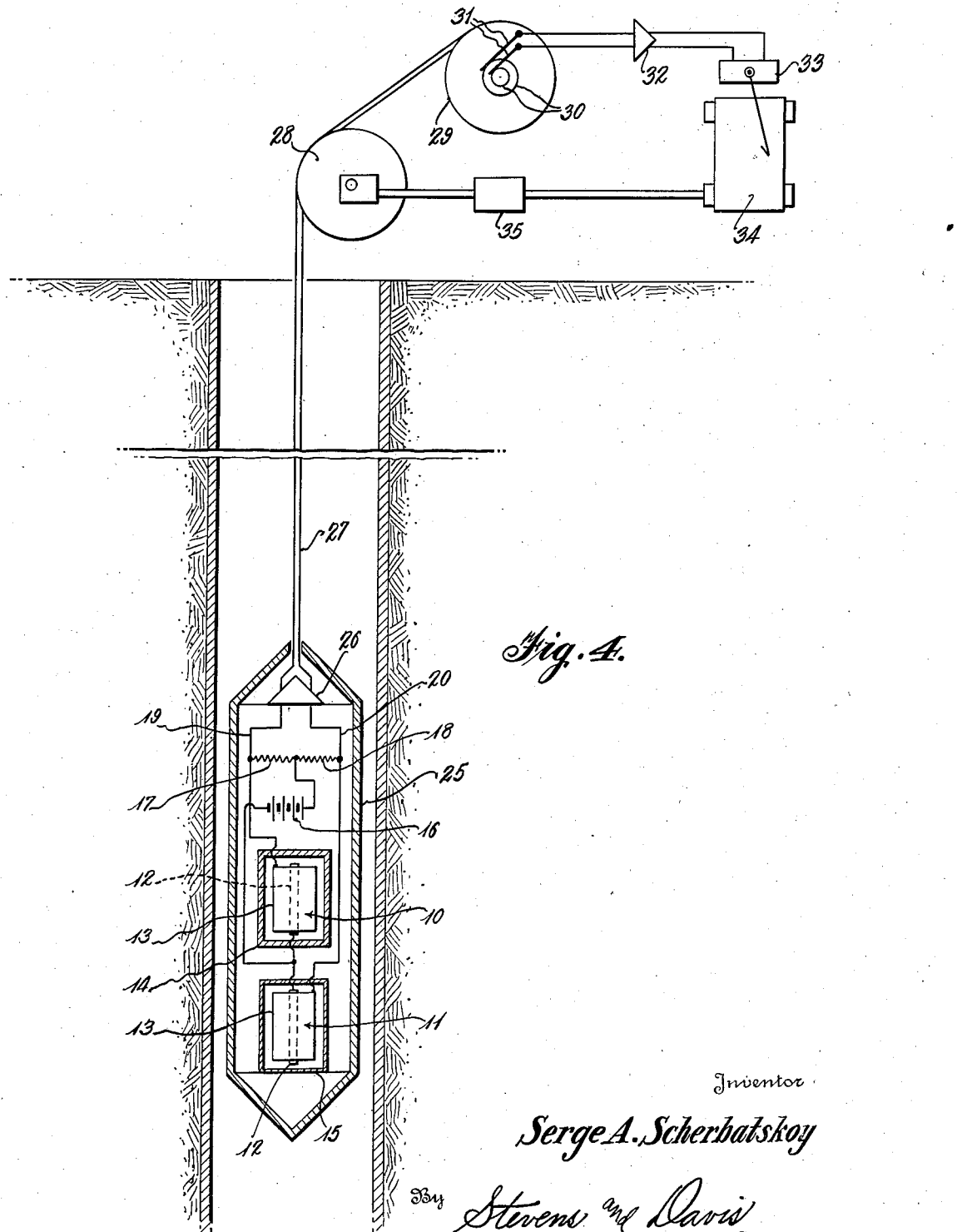

Patented June 9, 1942

2,285,840

UNITED STATES PATENT OFFICE 2,285,840

WELL SURVEY METHOD AND APPARATUS

Serge Alexander Scherbatskoy, Tulsa, Okla., assignor to Well Surveys, Incorporated, Tulsa, Okla., a corporation of Delaware Application August 4, 1939, Serial No. 288,456

21 Claims. (Cl. 250—83.6)

This invention relates to a method and device for geophysical exploration and particularly to a device adapted to be lowered into a drill hole and to gather information about the nature of the geological formations adjacent thereto.

Many methods of geophysical exploration are already known and among them several methods of determining the nature of geological formations adjacent drill holes or other openings already present in the area to be studied. Of these methods of well surveying or drill hole prospecting, that of lowering a detector of radiations from radio active material into a drill hole and correlating the measurements made therewith with the depth at which the measurements are made offers particularly interesting possibilities in that the radiations from radio-active material will penetrate for quite some distance through the surrounding strata and be received by the detector of radiations even though the drill hole may be surrounded by a steel casing and the detector itself securely enclosed in a steel compartment. Furthermore, it has been discovered that there are sufficient differences in the radio activities of the various materials that are likely to surround the drill hole so that practical indications of the various types of material and the interfaces between them may be obtained by this method.

For the above reasons considerable attention is now being given to this general process of subsurface geophysical prospecting. However, there is a difficulty involved in this type of prospecting which at times tends to make the results more confusing than helpful and in any event makes more difficult and less certain the interpretation of the results obtained therein. This difficulty is due to the fact that quite often the drilling mud or the oil or the metallic pipe that forms the drill casing, or other materials introduced into the area being studied are naturally or become for one reason or another, a source of radiations. When this happens, the radiations received by the detector are no longer a true representation of the normal surrounding strata but are a composite of the radiations from the normal surrounding strata and the radiations from the introduced source.

The same difficulty occurs in measuring reflected radiations, when a source of radiations is lowered into a well and those radiations which pass out into the surrounding strata and are reflected back are measured as disclosed in application Serial No. 239,781 filed by Robert E. Fearon on November 10, 1938, and Patent No. 2,133,776 granted to Bender on October 18, 1938.

In order to avoid this source of difficulty and provide a system that will measure acurately the self-emitted or reflected radiations from the normal surrounding strata to the exclusion of these from accidently introduced sources of radiation or reflection, the present invention has been devised.

According to this invention it has been discovered that radiations detected by the ordinary detector of radiations such as an ionization chamber, are of two kinds which may be generally classified as "hard" and "soft." While the ratio of soft to hard radiations at the source is usually fairly constant, the soft radiations have relatively little penetrating power and hence have almost no effect on the instrument unless they come from closely adjacent formations, those originating further away all being filtered out by the intervening material. The hard radiations on the other hand have a much greater penetrating power and are effective not only from close to the detector but from a considerable distance away as well.

Taking advantage of this situation this inventor has found that by measuring both the soft and the hard radiations and then by subtracting this measurement from a measurement, on a sufficiently enlarged scale, of the hard radiations only, he may obtain a measurement or indication of the amount of radiations originating at a point or area removed a definite distance from the detector or that have traveled a definite distance before being reflected to the detector, to the almost entire exclusion of any measurement of radiations originating immediately adjacent to the detector.

The exact manner in which the present invention is carried into practice and many of its details and advantages may be more completely understood by reference to the accompanying drawings and the following detailed descriptions thereof.

In the drawings:

Figure 1 is a graphical representation of the effectiveness of the two general types of radiations which originate at various distances from the detector, and also a graphical representation of the manner in which they are combined to give the desired results;

Figure 2 is a diagrammatic illustration of one circuit arrangement that may be used;

Figure 3 is a diagrammatic illustration of an alternative circuit arrangement that may be used; and Figure 4 is a diagrammatic illustration of a complete well surveying instrument constructed according to the principles of this invention.

In Figure 1 the curve H indicates the effect on the detector of a unit quantity of hard radiation originating at various distances from the detector. It will be noted that the effectiveness of the radiation diminishes as the distance from the detector increases.

The curve H+S is a similar graphical illustration of the effectiveness of the same unit quantity of hard radiation plus the quantity of soft radiation that will usually be encountered therewith. The curves H and H+S are identical for relatively large distances from the detectors for the soft radiations are entirely ineffective, but for shorter distances the soft radiations are effective and hence the curve H+S is above the curve H.

In combining the values indicated by the curves H and H+S to get the desired results, the effect of the hard radiations alone is first increased relative to the effect of the hard and soft radiations, by amplification or increase in the sensitivity of the detector or taking the voltage representing the effect across a greater resistance or other means. The curve H is thus caused to become the curve H' the values indicated by which, are great enough so that the values indicated by the H+S may be subtracted therefrom. This may be done electrically or mechanically in any one of a large number of ways, some of which will be illustrated later, and the result is the values shown by the curve $$H' - (H+S)$$

From inspection of this latter curve it is immediately evident that radiations originating a substantial finite distance from the detectors have greater influence thereon than those originating from closer thereto.

Thus, if a pair of detectors are used in the relation indicated, radioactive materials lying closely adjacent to the detector will have little or no effect on the detectors as compared with those lying farther away. This is a particular advantage because it is natural that the artificially or accidentally introduced sources of radioactivity will lie in the drill hole or immediately surrounding it whereas the formations somewhat further away will still remain in their normal state. Thus the present invention permits the measurement of the original radioactivity of the formations substantially without interference from anything that may have been artificially introduced.

Basically, the present invention comprises measuring the hard radiation, measuring the hard and soft radiations at the same point, obtaining the results on the proper scales which are generally not the same for the two measurements and subtracting. More specifically it comprises providing a pair of ionization chambers one of which is sufficiently shielded so that it will receive only hard radiations, applying potential to the electrodes of the ionization chambers through one or more resistors across which potentials are developed proportional to the current flows through the ionization chambers, arranging the circuit so that the potentials developed are in opposition and on the proper relative scales and measuring the resultant potential.

Specific apparatus capable of use according to the new method is illustrated in Figures 2 and 3 of the drawings in diagrammatic form.

In Figure 2 there is provided a pair of ionization chambers 10 and 11, each consisting of a pair of electrodes enclosed in a sealed compartment which contains nitrogen under around 300 pounds of pressure. In each case the inner electrode 12 is an iron rod about a half an inch in diameter and about five inches long. The outer electrode 13 is a sheet iron cylinder, open at the end, about 2 inches in diameter and about 5 inches long. The enclosing compartment 14 of the ionization chamber 10 is of fairly heavy sheet steel preferably approximately three-eighths of an inch in thickness. The enclosing compartment 15 of ionization chamber 11 is of much thinner steel, preferably about one-sixteenth of an inch thick. The thicker case tends to shield the elements within it from soft radiations whereas the thinner case 15 is unable to do so and the elements within it are subjected both to the hard and to the soft radiations.

According to Figure 2 a potential is applied between the elements of each of the ionization chambers by means of a battery 16, one terminal of which is connected to the central electrodes of both chambers and the other terminal of which is connected through resistors 17 and 18, respectively, to the outer electrodes 13 of the chambers 14 and 15. Electrical connections 19 and 20 taken from the opposite ends of resistors 17 and 18 obviously carry a potential equal to the difference between the voltage drop across resistor 17 and the voltage drop across resistor 18. This voltage may be conveyed to the surface and recorded.

As was stated above it is not usually desirable to subtract a determination made by one of the ionization chambers from the determination made by the other ionization chamber when the two are on the same scale of magnitude. In other words, it is more often desirable to multiply one of the determinations by some constant factor so that the voltages produced across the resistors 17 and 18 will have the approximate relation to each other that is indicated by the curves H' and H+S Figure 1. In the present device this may be expeditiously accomplished by properly choosing the resistors 17 and 18. For example, if the resistor 18 is higher than the resistor 17 the potential drop across it for a given current flow will be greater than would the potential drop across resistor 17 for the same current flow. Thus the resistors may be chosen so as to cause the potentials developed to bear the proper relation to each other. For example, it has been found that a resistance of $10^{12}$ ohms for resistor 17 and $2 \times 10^{11}$ for resistor 18 will give approximately the proper balance between the voltages developed in the two resistors.

As an alternative arrangement that shown by Figure 3 may be used. In the device here shown the ionization chambers are similarly constructed but differently connected. Instead of connecting both of the central electrodes 12 to one terminal of a battery, the two electrodes are connected to the opposite terminal of a battery 21. From an intermediate terminal of the battery the outer electrodes 13 are connected through a resistor 22 to an intermediate terminal of the battery. Connections 23 and 24 to opposite ends of resistor 22 receive a potential which represents the difference between the potentials applied to resistor 22 by the currents flowing in the two ionization chambers.

With this arrangement it is necessary to adjust the intermediate connection to the battery so as to apply the proper amount of potential to each of the two ionization chambers so that the current passing through them will be in the proper relation to be directly subtracted for there is but a single resistor and hence no separate adjustment of resistance for each of the ionization chambers is possible. Furthermore, this modification has a slight disadvantage in that the operation of one ionization chamber has a slight effect on the operation of the other by changing the potential across resistor 22 and hence the potential on the other ionization chamber. Still further the battery must be of approximately twice the voltage necessary according to Figure 2 and differences between the two halves of the battery can conceivably unbalance the system. These difficulties are not so serious however but what the device can be used with quite satisfactory results even in this form.

As shown in Figure 4 the detecting arrangement of Figure 2, exactly as there shown, is encased in a cylindrical housing 25 that is arranged to be hermetically sealed so as to protect the enclosed instruments from oil or water or other materials that may be encountered in a well. The housing 25 also encloses an amplifier 26 which receives the output current from the measuring instrument of Figure 2 and after amplifying this output passes it into a supporting cable 27 which serves to support the casing in the well and also to convey the indicating current from the amplifier to the surface recording apparatus. At the surface the supporting cable 27 passes over a measuring wheel 28 and is wound onto a cable reel 29 which is driven by a source of power not shown to raise and lower the housing in the well during the progress of the surveying operation. From the cable reel 29 the indicating currents are taken through slip rings 30 and brushes 31 and carried to an amplifier 32 from which they pass to a recorder 33 which records them on a recording strip 34 which is driven by a mechanical connection 35 from the measuring wheel 28 so that the tape will move in accordance with the movements of the housing in the well and will thus correlate the measurements of radioactivity with indications of the position of the capsule in the well. This mechanical connection 35 may be replaced by an electrical transmission system such as the well known "Selsyn" transmission system if desired and this replacement will often be found desirable in field operations because it will permit the recording equipment to be located at some distance from the top of the well.

Still other embodiments of the principles of this invention and numerous circuit modifications may be made all within the scope of the invention. It is therefore to be understood that the particular embodiments illustrated are but examples of the preferred forms of apparatus to be used according to this invention and that it is not intended that the invention should be limited to these particular forms of apparatus.

I claim:

1. A method of geophysical exploration utilizing radiations of the type that emanate from radioactive materials that comprises measuring the intensity of the radiations, both of the hard and soft variety, present at various locations adjacent the formations to be explored, measuring the intensity of the hard radiations only at the same locations, and combining said two measurements at each location to obtain a differential measurement for each location.

2. A method of geophysical exploration utilizing radiations of the type that emanate from radioactive materials that comprises measuring the intensity of the radiations, both of the hard and soft variety, present at various locations adjacent the formations to be explored, measuring the intensity of the hard radiations only at the same locations, and combining said two measurements at each location to obtain a comparative measurement for each location, while balancing the means for obtaining said original measurements so that radiations from a substantial distance away from the measuring locations have a greater effect on the differential measurements than radiations originating closer to said measuring locations.

3. A method of geophysical exploration utilizing radiations of the type that emanate from radioactive materials that comprises measuring at various depths in an opening in the earth the intensity of the radiations, both of the hard and soft variety, present at said depths, measuring the intensity of the hard radiations only at the same depths, and combining the two measurements at each depth to obtain a differential measurement for each depth.

4. A method of geophysical exploration utilizing radiations of the type that emanate from radioactive materials that comprises measuring at various depths in an opening in the earth the intensity of the radiations, both of the hard and soft variety, present at said depths, measuring the intensity of the hard radiations only at the same depths, and combining the two measurements at each depth to obtain a differential measurement for each depth, while balancing the means for obtaining said original measurements so that radiations from a substantial distance away from the measuring location have a greater effect upon the differential measurements than radiations originating closer to said measuring locations.

5. A method of geophysical exploration utilizing radiations of the type that emanate from radioactive materials that comprises continuously measuring throughout a range of depths in an opening in the earth, the intensity of the radiations, both of the hard and soft variety, present at the said depths measuring the intensity of the hard radiations only, at the same depths, combining said two series of measurements to obtain a differential measurement for each location and correlating these differential measurements with measurements of the depths at which they are taken.

6. A device for determining the nature of geological structures that comprises a pair of ionization chambers one of which is shielded against radiations to a greater extent than the other, means for impressing an electrical potential between the electrodes of said ionization chambers, means for measuring the current flow in the ionization chambers, means for differentially combining said measurements and means for correlating the resulting measurements with indications of the location of the ionization chambers.

7. A device for determining the nature of geological structures that comprises a pair of ionization chambers one of which is shielded against radiations to a greater extent than the other, a source of electrical potential connected to both of said ionization chambers, a resistor in series with said source of potential and one of said ionization chambers, a second resistor in series with said source of potential and the other ionization chamber and means to measure the difference in voltage drop developed across said two resistors.

8. A device for determining the nature of geological structures that comprises a pair of ionization chambers one of which is shielded against radiations to a greater extent than the other, a source of electrical potential connected to both of said ionization chambers, a resistor in series with said source of potential and one of said ionization chambers, a second resistor in series with said source of potential and the other ionization chamber, means to determine the difference between the potentials developed across said resistors, means to determine the position of said ionization chambers and means to record the positions of said ionization chambers in correlation with the difference between the potentials.

9. A device for determining the nature of geological structures that comprises a pair of ionization chambers one of which is shielded against radiations to a greater extent than the other, a source of electrical potential one terminal of which is connected to an electrode of each of the ionization chambers and the other terminal of which is connected through a resistance to the other electrode of one of the ionization chambers and through a second resistance to the other electrode of the second ionization chamber, means to measure the potential difference between the ends of the resistors opposite to those connected to the source of potential, means to determine the position of the ionization chambers and means to record the position of the ionization chambers in correlation with the potential difference between the opposite ends of the resistors.

10. A device for determining the nature of geological structures that comprises a pair of ionization chambers one of which is shielded against radiations to a greater extent than the other, a resistance one end of which is connected to an electrode in each of said ionization chambers, a source of electrical potential connected to the other end of said resistance and to the other electrode of one of said ionization chambers, a second source of potential the terminal of which having opposite polarity is attached to the same end of the resistor to which the first mentioned source of potential is attached and the other terminal of which is attached to the remaining electrode of the other ionization chamber and means for determining and recording the potential drop across said resistance in correlation with an indication of the position of the ionization chambers.

11. A device for determining the nature of geological structures adjacent a drill hole or similar opening in the earth which comprises a pair of ionization chambers one of which is shielded against radiations to a greater extent than the other and both of which are adapted to be lowered into the opening to be explored as a single unit, means for impressing an electrical potential between the electrodes of said ionization chambers, means for measuring the current flow in the ionization chambers, means for differentially combining said measurements and means for correlating the resulting measurements with indications of the locations of said ionization chambers in the drill hole.

12. A method of geophysical exploration which comprises the steps of measuring at determinable places a band of radiations emanating from formations adjacent said places, measuring at the same places another band of radiations emanating from said formations adjacent said places, and combining the measurements obtained.

13. A method of geophysical exploration which comprises the steps of measuring at various depths in a bore hole a characteristic of formations closely adjacent thereto, measuring at various depths in said bore hole a characteristic of formations both closely adjacent and farther away therefrom, and combining the measurements obtained.

14. A method of geophysical exploration which comprises the steps of measuring at various depths in a bore hole of characteristic of formations closely adjacent thereto, measuring at various depths in said bore hole a characteristic of formations both closely adjacent and farther away therefrom, measuring the depths at which said measurements were obtained, correlating the measurements obtained, and combining the measurements resulting from said correlation with the depth measurements.

15. A method of geophysical exploration which comprises the steps of measuring at various depths in a bore hole a characteristic of formations adjacent said bore hole, measuring at various depths in the bore hole a different characteristic of formations adjacent said bore hole, combining the measurements of the characteristics within the bore hole, transmitting the combined measurements to the surface, and combining said measurements with the measurements of the depths at which said characteristics were measured.

16. A method of geophysical prospecting which comprises measuring the intensity of radiations of one range of frequencies coming from a formation about which information is desired, measuring the intensity of radiations of another range of frequencies coming from said formation and combining the measurements obtained.

17. A method of geophysical prospecting that comprises separately measuring the intensity of radiations of a plurality of frequency ranges coming from a formation about which information is desired, and combining the measurements obtained.

18. A device for determining the nature of geological structures that comprises a pair of ionization chambers one of which is shielded against radiations to a greater extent than the other, means for impressing an electrical potential between the electrodes of said ionization chambers, means for measuring a function of the current in the ionization chambers, means for differentially combining said measurements and means for correlating the resulting measurements with indications of the location of the ionization chambers.

19. A device for determining the nature of geological structures that comprises a pair of ionization chambers one of which is shielded against radiations to a greater extent than the other, a source of electrical potential connected to both of said ionization chambers, a resistor in series with said source of potential and one of said ionization chambers, a second resistor in series with said source of potential and the other ionization chamber, means to combine the voltages developed across said two resistors to produce a signal indicative of a function of said voltages, and means for indicating said signal.

20. A device for determining the nature of geological structures that comprises a pair of ionization chambers one of which is shielded against radiations to a greater extent than the other, a source of electrical potential connected to both of said ionization chambers, a resistor in series with said source of potential and one of said ionization chambers, a second resistor in series with said source of potential and the other ionization chamber, means to combine the potentials developed across said resistors to produce a signal indicative of a function of said potentials, means to determine the position of said ionization chambers and means to record the positions of said ionization chambers in correlation with the signal.

21. A geophysical prospecting device that comprises a first and a second independent means for detecting gamma rays, means for independently translating indications from both of the detecting means into electrical currents, means for combining the currents to produce a single signal indicative of a functional relationship between the combined currents, and means for recording the signal so obtained.

SERGE ALEXANDER SCHERBATSKOY.